United States Patent [19]

Haubs et al.

[11] Patent Number: 5,189,104
[45] Date of Patent: Feb. 23, 1993

[54] ALLOYS HAVING ONE GLASS TRANSITION TEMPERATURE

[75] Inventors: Michael Haubs, Bad Kreuznach; Otto Hermann-Schönherr, Bensheim; Harald Cherdron, Wiesbaden, all of Fed. Rep. of Germany

[73] Assignee: Hoechst Aktiengesellschaft, Frankfurt am Main, Fed. Rep. of Germany

[21] Appl. No.: 595,294

[22] Filed: Oct. 10, 1990

[30] Foreign Application Priority Data

Oct. 12, 1989 [DE] Fed. Rep. of Germany ....... 3934026

[51] Int. Cl.$^5$ .............................................. C08L 77/00
[52] U.S. Cl. .................................... 525/180; 525/181; 525/182; 525/420; 525/421; 525/426
[58] Field of Search .................... 525/180, 181, 182

[56] References Cited

U.S. PATENT DOCUMENTS

| | | | |
|---|---|---|---|
| 2,958,677 | 11/1960 | Kleinschmidt et al. | 525/182 |
| 3,036,988 | 5/1962 | Knospe | 525/182 |
| 3,211,807 | 10/1965 | Gillies et al. | 525/182 |
| 5,073,440 | 12/1991 | Lee | 525/182 |
| 5,075,392 | 12/1991 | Harris et al. | 525/420 |

Primary Examiner—John Kight, III
Assistant Examiner—Shelley A. Wright
Attorney, Agent, or Firm—Curtis, Morris & Safford

[57] ABSTRACT

Polymer alloys based on polybenzimidazoles are of great interest in industry due to their extraordinary thermal and mechanical properties. Alloys composed of a homo- or copolybenzimidazole and poly-N-vinylpyrrolidone are homogeneously mixed and have only one glass transition temperature.

15 Claims, No Drawings

ALLOYS HAVING ONE GLASS TRANSITION TEMPERATURE

DESCRIPTION

The invention relates to alloys having a glass transition temperature and being composed of a homo- or copolybenzimidazole and poly-N-vinylpyrrolidone, processes for their preparation and their use.

It is known to alloy polymers in order to prepare new materials such as are not available or only available with difficulty by a different method, for example by copolymerization. In this manner, it is in particular possible to improve or selectively adjust technologically important properties and to increase the economic efficiency.

It is also known that the predominant majority of pairs of polymers form two-phase blends after mixing and that these mixtures are distinguished by opacity, different thermal transitions (for example glass transitions) and poor mechanical properties (cf. Olabisi, Robeson, Shaw: Polymer—Polymer Miscibility, Academic Press, New York, p. 7, 1979).

However, the properties of an alloy cannot be predicted with certainty from the properties of the individual components. That is why the alloying of polymers remains substantially empirical. It is in particular not possible to predict the homogeneous miscibility of alloys, specifically those made of strongly interacting polymers, despite a very large amount of experimental and theoretical work in this area. Thus, it is known that homogeneously miscible polymer alloys are rare (cf. Journal of Polymer Science, Polymer Physics Edition, 21, 11 (1983)).

A definite criterion for homogeneous miscibility is the presence of a single glass transition temperature which is between the glass transition temperatures of the components used for preparing the mixture. The transparency of polymer alloy films is an indication that the components are present in homogeneously mixed form. Therefore, homogeneously mixed alloys are hereinafter taken to mean those having a single glass transition temperature.

There is considerable interest in industry in homogeneously mixed polymer alloys, since their properties can be selectively adapted to certain requirements by varying the components and the mixing ratio. As a result of their extraordinary thermal and mechanical properties, polybenzimidazoles are of particular interest as an alloying component.

For certain applications, for example for improving the processability, a decrease in the glass transition temperature is desirable. The selective adaptation of mechanical properties is also required in practice. Finally, for many applications it is important to achieve a certain water absorption capacity. Examples which may be mentioned are wear comfort of fiber fabrics and hydrophilicity and thus resistance of the semipermeable membranes to fouling.

The object was therefore to provide homogeneously mixed polybenzimidazole alloys, i.e. alloys having a single glass transition temperature.

It has now been found that alloys made of polybenzimidazoles with poly-N-vinylpyrrolidone have a single glass transition temperature.

The invention relates to an alloy having a single glass transition temperature and being composed of a) at least one homo- or copolybenzimidazole and b) poly-N-vinylpyrrolidone.

The invention furthermore relates to a process for the preparation of an alloy having a single glass transition temperature, which comprises adding poly-N-vinylpyrrolidone, dissolved or undiluted, to a solution of a polybenzimidazole and then removing the solvent.

In addition, the invention relates to a process for the preparation of an alloy having a single glass transition temperature, which comprises synthesizing the polybenzimidazole in the presence of poly-N-vinylpyrrolidone.

The invention likewise relates to the use of an alloy for the production of moldings, films, membranes, coatings or fibers.

The polybenzimidazoles are composed of repeating units of the formula (I)

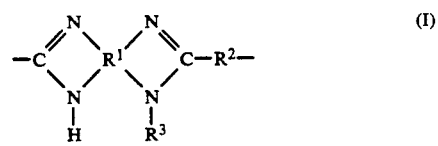

in which $R^1$ a tetravalent aromatic ring in which the nitrogen atoms which form the benzimidazole rings are linked to one another in pairs via adjacent carbon atoms of the aromatic ring, $R^2$ is an aromatic or heterocyclic ring, for example pyrazylene, furylene, quinolinediyl, thiophendiyl, pyrylene and pyridinediyl, and $R^3$ is —H, phenyl or —CH$_2$CH$_2$OH.

$R^1$ is preferably

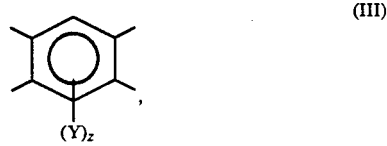

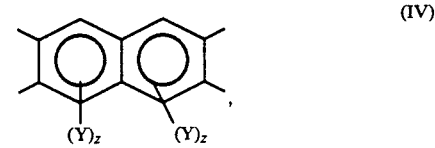

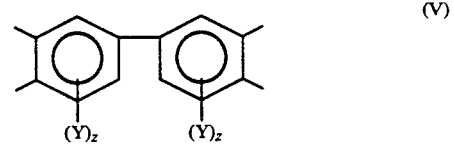

or

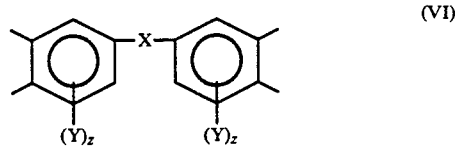

in which

—X— is —O—, —S—, —SO$_2$— —CH$_2$—, —C(CH$_3$)$_2$—, —C(CF$_3$)$_2$— or —C$_2$H$_2$—,

Y is a lower alkyl or alkoxy radical and

Z is zero, 1 or 2 for the formulae (III) and (IV) and zero, 1, 2 or 3 for the formulae (V) and (VI).

$R^2$ is preferably

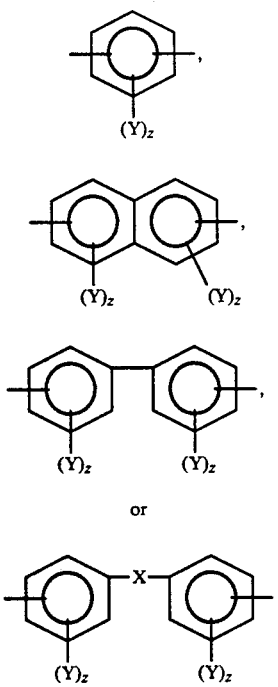

in which
—X— is —O—, —S—, —SO$_2$—, —CH$_2$—, —C(CH$_3$)$_2$—, —C(CF$_3$)$_2$— or —C$_2$H$_2$—,
Y is a lower alkyl or alkoxy radical and
Z is zero, 1, 2 or 3 for the formula (VIII) and zero, 1, 2, 3 or 4 for the formulae (VII), (IX) and (X).

The polybenzimidazole can be composed of repeating units of the formula (II)

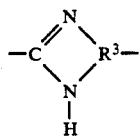

in which R$^3$ is an aromatic radical in which the nitrogen atoms which form the benzimidazole ring are linked to one another in pairs via adjacent C atoms of the aromatic radical.

In particular the following polybenzimidazoles are used:
poly-2,2'-(m-phenylene)-5,5'-bibenzimidazole,
poly-2,2'-(pyridylene-3",5")-5,5'-bibenzimidazole,
poly-2,2'-(furylene-2",5")-5,5'-bibenzimidazole,
poly-2,2'-(naphthylene-1",6")-5,5'-bibenzimidazole,
poly-2,2'-(biphenylene-4",4''')-5,5'-bibenzimidazole,
poly-2,2'-amylene-5,5'-bibenzimidazole,
poly-2,2'-octamethylene-5,5'-bibenzimidazole,
poly-2,6-(m-phenylene)-diimidazobenzene,
poly-2,2'-cyclohexenyl-5,5'-bibenzimidazole,
poly-2,2'-(m-phenylene)-5,5'-di(benzimidazole) ether,
poly-2,2'-(m-phenylene)-5,5'-di(benzimidazole) sulfide,
poly-2,2'-(m-phenylene)-5,5'-di(benzimidazole) sulfone,
poly-2,2'-(m-phenylene)-5,5'-di(benzimidazole)methane,
poly-2,2"-(m-phenylene)-5,5"-di(benzimidazole)-2,2-propane and
poly-2,2"-(m-phenylene)-5,5"-di(benzimidazole)-1,2-ethylene.

Apart from the polybenzimidazoles, such as are described here, copolymers, terpolymers and in particular block copolymers are also suitable for the preparation of alloys having a glass transition temperature.

The polybenzimidazoles have Staudinger indices of 0.2 to 2.5 dl/g, measured in N-methyl-2-pyrrolidone at 25° C., preferably of 0.3 to 2, and in particular of 0.4 to 1.5 dl/g.

The molecular weight of poly-N-vinylpyrrolidone (PVP), given as the weight average, is in the range of 1000 to 3 million, preferably 20,000 to 200,000.

PVP is used in amounts of 1 to 99% by weight, preferably 10 to 90% by weight, in particular 15 to 50% by weight, relative to the sum of the components.

To further improve the properties, the alloys can contain additives, such as heat stabilizers, UV stabilizers or reinforcing additives, such as glass fibers, carbon fibers or high modulus fibers.

The alloys can be used for the production of moldings, fibers, membranes, coatings or films.

The alloys according to the invention can be prepared in a conventional manner by adding PVP, dissolved or undiluted, to a solution of at least one polybenzimidazole. The solvent can be, for example, an aprotic organic solvent, such as dimethylformamide, dimethyl sulfoxide, N-methyl-2-pyrrolidone or N,N-dimethylacetamide, or a mixture of these solvents.

The polybenzimidazole can also be synthesized in the presence of poly-N-vinylpyrrolidone.

To improve the solubility of the polybenzimidazoles, salts such as LiCl and CaCl$_2$ can be added.

The alloys can be isolated by removing the solvent, for example by evaporation, or can be further processed to give films, fibers or membranes in a known manner.

The invention is illustrated by the examples which follow and for which PVP having an $\overline{M}w = 50,000$ and a 25 percent strength by weight solution of poly-2,2'-(m-phenylene)5,5'-bibenzimidazole (PBI) of a Staudinger index of 0.7 dl/g, dissolved in dimethylacetamide, were used with the use of the addition of 2% by weight of LiCl.

EXAMPLES

Comparative Example A 5 g of PVP ($\overline{M}w = 50,000$) were dissolved together with 5 g of a polyether imide of a Staudinger index of 0.5 dl/g, measured at 25° C. in CHCl$_3$, of the formula

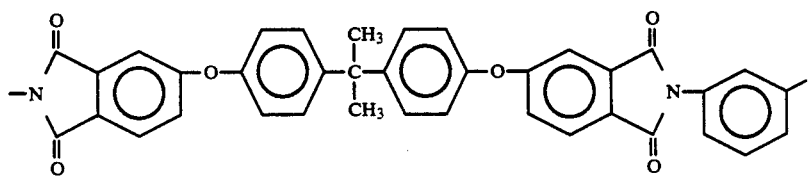

(Tg=217° C.) in 90 g of N-methylpyrrolidone (NMP), and the solvent was then removed by evaporation under reduced pressure. The alloy had the two glass transition temperature of the starting materials of 175° C. and 217° C. and was therefore not homogeneously mixed.

EXAMPLE 1

Testing the miscibility

Solutions of PVP in dimethylacetamide were prepared and mixed with PBI in different amounts (see Table I). The mixed solutions obtained were then freed from the solvent at 110° C. under reduced pressure to constant weight. The resulting PVP/PBI alloys had in each case a single glass transition temperature according to DSC measurements (cf. Table I).

TABLE I

| Glass transition temperature of PBI/PVP alloys | | | | | |
|---|---|---|---|---|---|
| PVP content in % by weight | 0 | 35 | 50 | 75 | 100 |
| Glass transition temperature in °C. | 412 | 336 | 312 | 245 | 175 |

EXAMPLE 2

Manufacture of films

Solutions of PBI and PVP were prepared according to Example 1, the solutions were degassed and cast to form films. This was done by spreading the mixed solutions on glass plates at 60° C. with a knife. The cast films were then predried at 90° C. for 48 hours under reduced pressure, then hydrated for 2 days and finally the film was freed from the solvent at 120° C. under reduced pressure to constant weight. The resulting films were transparent and each had a single glass transition temperature detectable by different calorimetry (cf. Table II), which did not differ from the one shown in Table I. This means that water does not dissolve and remove PVP from the alloys investigated. This fact and the transparency of the films are a further indication for the homogeneous miscibility of PBI with PVP.

TABLE II

| Glass transition temperatures of PBI/PVP alloy films | | |
|---|---|---|
| PVP content in % by weight | 35 | 50 |
| Glass transition temperature in °C. | 336 | 312 |

EXAMPLE 3

Measuring the water absorption

Films were prepared according to Example 2 and the water absorption capacity measured at 23° C. and at 85% relative humidity (Table III).

TABLE III

| Water absorption capacity of PBI/PVP alloys | | |
|---|---|---|
| PVP content in % by weight | 0 | 35 |
| Water absorption capacity in % by weight | 15 | 20 |

EXAMPLE 4

A solution of 12 g of PBI and 8 g of PVP (MW=50,000) in 80 g of N,N-dimethylacetamide was sheeted out on a flat glass plate by means of a knife to give a film 200 μm in thickness and coagulated in water in 20° C. After a hydrating time of 1 day, the membrane was tested in a stirred cell at 25° C. The following values were measured:

| 1.) | Water flow rate: | 238 l/m² · h at 3 bar |
| 2.) | Retention for PVP: (as 2 percent solution in H₂O) | 78% at 3 bar |

We claim:

1. An alloy having a single glass transition temperature and being composed of
   a) at least one homo- or copolybenzimidazole and
   b) poly-N-vinylpyrrolidone, wherein the polybenzimidazole has repeating units of formula I

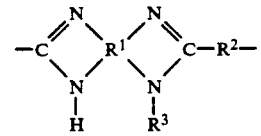

in which $R^1$ is a tetravalent aromatic ring in which the nitrogen atoms are linked to one another in pairs via adjacent C atoms of the aromatic ring, $R^2$ is an aromatic or heterocyclic ring and $R^3$ is —H, phenyl or —CH₂CH₂OH; or, the polybenzimidazole has repeating units of formula

in which $R^4$ is an aromatic ring in which the nitrogen atoms which form the benzimidazole ring are linked to one another in pairs via adjacent C atoms of the aromatic ring; and, the polybenzimidazole has Staudinger indices of 0.2 to 2.5 dl/g, measured in N-methyl-2-pyrrolidone at 25° C; and the poly-N-vinylpyrrolidone has a molecular weight, given as the weight average, in the range of 1000 to 3 million.

2. A molding comprising the alloy of claim 1.
3. A film comprising the allow of claim 1.
4. A membrane comprising the alloy of claim 1.
5. A coating comprising the alloy of claim 1.
6. A fiber comprising the alloy of claim 1.
7. An alloy as claimed in claim 1 wherein the polybenzimidazole has Staudinger indices of 0.3. to 2 dl/g, measured in N-methyl-2-pyrrolidone at 25° C.
8. An alloy as claimed in claim 1 wherein the polybenzimidazole has Staudinger indices of 0.4 to 1.5 dl/g, measured in N-methyl-2-pyrrolidone at 25° C.
9. An alloy as claimed in claim 1 wherein the poly-N-vinylpyrrolidone is present in amounts of 10 to 90 percent by weight, relative to the sum of the components.
10. An alloy as claimed in claim 1 wherein the poly-N-vinylpyrrolidone is present in amounts of 15 to 50 percent by weight, relative to the sum of the components.
11. An alloy as claimed in claim 1, wherein $R^1$ in formula (I) is

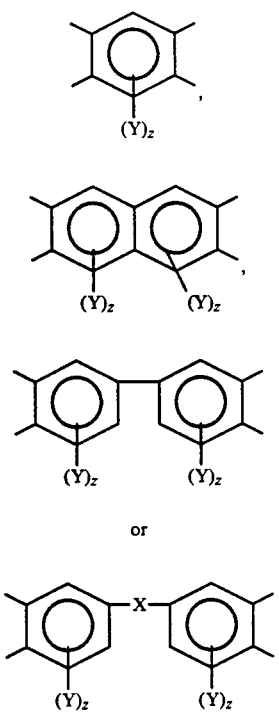

in which
—X— is —O—, —S—, —SO₂—, —CH₂—,
—C(CH₃)₂—, —C(CF₃)₂— or —C₂H₂—,
Y is a lower alkyl or alkoxy radical and
Z is zero, 1 or 2 for the formulae (III) and (IV) and zero, 1, 2 or 3 for the formulae (V) and (VI)
and in that R² in formula (I) is

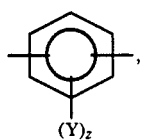

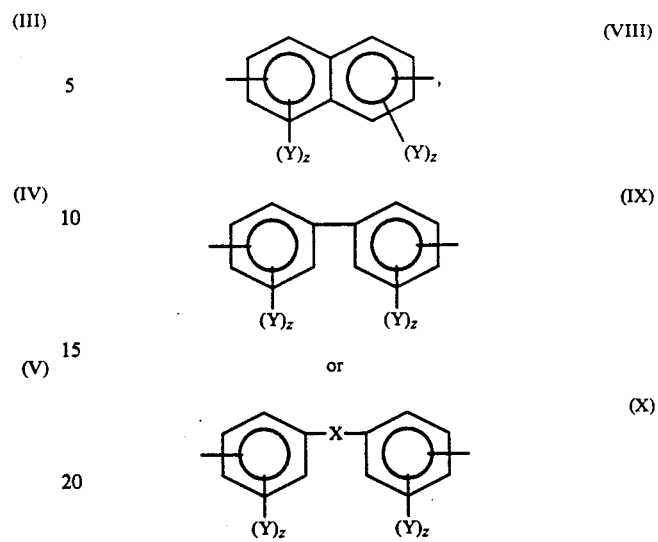

in which
—X— is —O—, —S—, —SO₂—, —CH₂—,
—C(CH₃)₂—, —C(CF₃)₂— or —C₂H₂—,
Y is a lower alkyl or alkoxy radical and
Z is zero, 1, 2 or 3 for the formula (VIII) and zero, 1, 2, 3 or 4 for the formulae (VII), (IX) and (X).

12. An alloy as claimed in claim 1, wherein the molecular weight of poly-N-vinylpyrrolidone, given as the weight average, is in the range of 20,000 to 200,000.

13. An alloy as claimed in claim 1, wherein the poly-N-vinylpyrrolidone is present in amounts of 1 to 99% by weight, relative to the sum of the components.

14. A process for the preparation of an alloy having a single glass transition temperature as claimed in claim 1, which comprises adding poly-N-vinylpyrrolidone, dissolved or undiluted, to a solution of a polybenzimidazole and then removing the solvent.

15. A process for the preparation of an alloy having a single glass transition temperature as claimed in claim 1, which comprises synthesizing the polybenzimidazole in the presence of poly-N-vinylpyrrolidone.

* * * * *